Oct. 9, 1951
E. F. WATSON
2,570,505
AUTOMATIC SYSTEM FOR CHECKING RECEIPT OF TELEGRAPH MESSAGES IN NUMERICAL ORDER
Filed Sept. 9, 1943
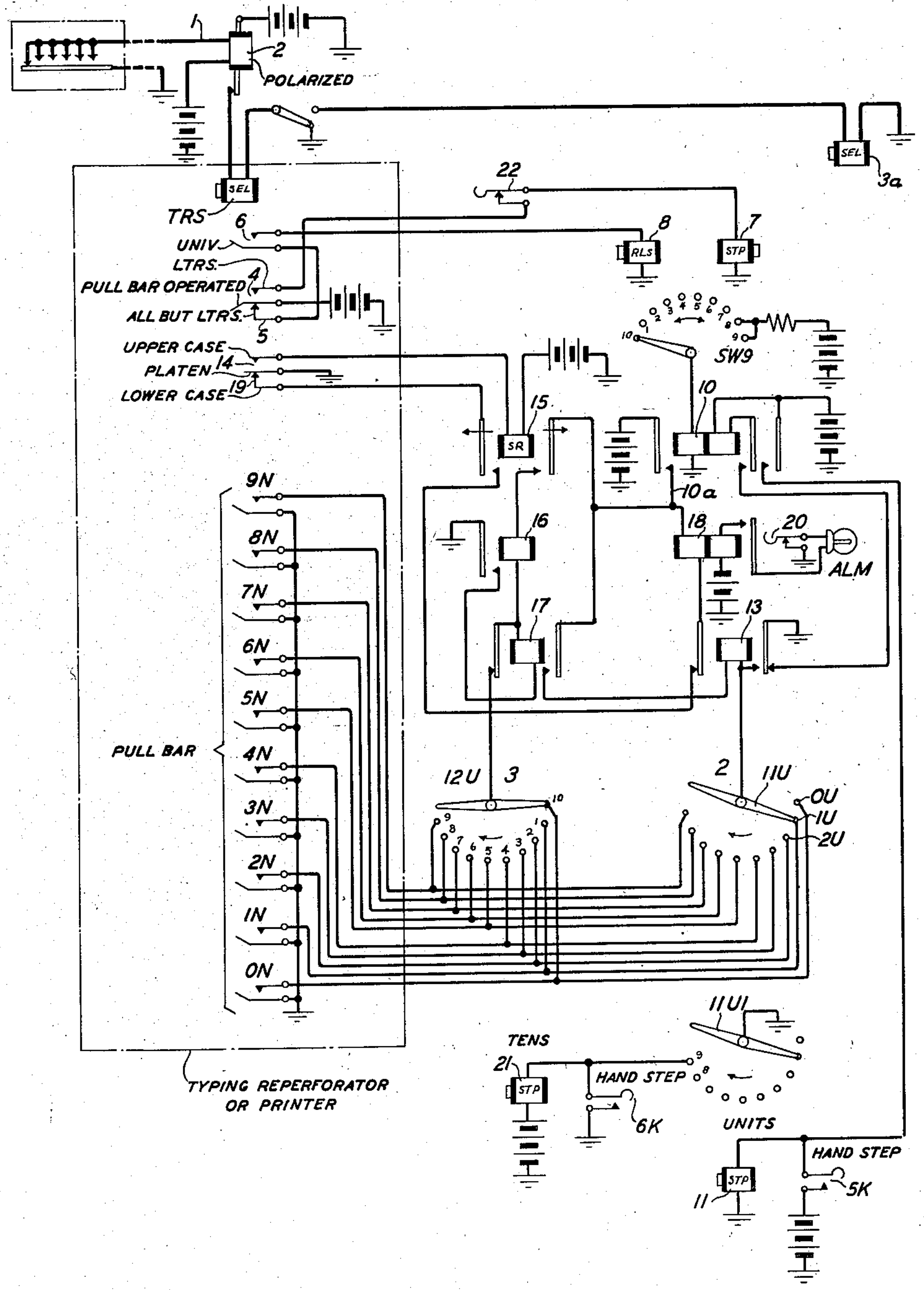
INVENTOR
E. F. WATSON
BY J W Schmied
ATTORNEY Patented Oct. 9, 1951 2,570,505

UNITED STATES PATENT OFFICE 2,570,505

AUTOMATIC SYSTEM FOR CHECKING RECEIPT OF TELEGRAPH MESSAGES IN NUMERICAL ORDER

Edward F. Watson, Larchmont, N. Y., assignor to Bell Telephone Laboratories, Incorporated, New York, N. Y., a corporation of New York Application September 9, 1943, Serial No. 501,658

6 Claims. (Cl. 178—2)

This invention relates to methods of and means for checking the receipt of consecutively numbered messages and for automatically producing an indication by sounding an alarm or otherwise automatically producing an effect to indicate the failure of the automatic apparatus to verify the receipt of any one of a number of consecutively numbered messages.

It is old in the telegraph art to transmit at the head end of each of a number of messages going over a particular communication channel a number designating the serial number of the message on that channel for the particular day or other period of time. The usual practice is to begin the day's transmission with message No. 1. Messages may be and often are numbered consecutively by the sending operator or in the case of tape transmission where the tapes are collected from a variety of incoming reperforators or local perforators by splicing codes representing the required number at the head end of each message in the form of extra codes representing the number. Alternatively the numbers of the messages may be transmitted by a keyboard sender included in the line at the sending end or the entire messages including the numbers may be transmitted from a keyboard operated transmitter. Furthermore, automatic numbering systems have been described in telegraph literature by which messages transmitted over a channel of transmission are automatically consecutively numbered.

In all such systems it may be desirable or advantageous to provide at a receiving system automatic means for verifying the receipt of such messages in the desired numerical order and sounding an alarm, giving an indication, or producing some other action in case a message of the series is received without the number which should accompany it as the next consecutive message of the series.

An object of the invention is to provide methods of and equipment for checking the receipt of messages numbered, lettered or otherwise designated by consecutive identifications. The methods and apparatus of the invention as described herein in an exemplary form are equally applicable for the intended purpose regardless of the method by which the messages are originally numbered, whether automatic or otherwise.

In the exemplary embodiment as described, numbered messages arriving over an incoming line operate the selector magnet of an instrument commonly known as a typing reperforator. Associated with the typing reperforator are a letters contact, that is, a contact closed by the platen so long as it remains in the letters or lower case code position, a universal contact, and two other contacts closed by the platen of the receiving instrument in figures and letters position. A relay system and other instrumentalities interassociate these contacts with a system of pull bar contacts which are closed under control of the message numbers in consecutive order and a series of contacts closed under the control of end-of-message signals and stepping switches. These numerical contacts are set initially at 00 or 01, or any other number which is to be the number of the first message and are stepped forward after completion of the registration of the number of each message to the next contact and so on to check the identification of each message of a series. In case the number of any message is not correctly received as would be the case if the whole message were lost or if the number were erroneously transmitted, an alarm is sounded.

Complete automatic operation of a system of this type of end-of-message signal is essential in order that the equipment may recognize the termination of one message in order to step the numerical number checking equipment forward to check the number of the next message. For ordinary messages in plain language and for purposes other than automatically checking the numbers of messages an end-of-message indication, such as upper case J or other end-of-message signal consisting of one, two or three specially selected code combinations, have been used in other systems and might be used herein. However, there is a demand in certain fields for transmission of telegraph messages in cipher. In such systems practically all code combinations and simple successions of code combinations are likely to occur with reasonable frequency in the ciphered text for which reason a simple end-of-message signal would not be practicable because it might occur from time to time in the ciphered text and thus give false indications.

A feature of the present invention consists of an end-of-message signal which will occur in cipher transmission with such extraordinary infrequency that its use is practicable. This feature of the invention is of broad applicability whenever any end-of-message signal is required for cipher transmission. Specifically, in the exemplary embodiment the end-of-message signal comprises a letters signal eight times repeated with no other code combination needed. With random cipher transmission the probability is that such a series of letters signals will occur but once for each $32^8$ characters transmitted. Some combination other than letters might be chosen, however, if it better suited a particular purpose. In unciphered transmission "upper case J" or any number of such other code combinations could be used.

The exemplary embodiment of the invention is described in connection with the accompanying drawing in which the sole figure comprises the essentials of the circuit arrangement useful for circuit transmission.

Instrumentalities utilized in this circuit arrangement are conventional pieces of equipment generally known to telegraph engineers and for this reason need no detailed description.

A line or circuit 1 indicates generally a line circuit or channel over which messages in start-stop permutation code are incoming. Specifically, it may be assumed that these messages are in plain text and that at the beginning of each message is a number representing the ordinal or serial number of that message in the sequence of messages and at the end of each message is a series of eight or more consecutive letters code combinations. Let us assume that at the beginning of operation, stepping switch 2 is positioned on its No. 1 contact and a stepping switch 3 is on its zero contact. The typing reperforator which is actuated by the selector magnet TRS has a series of contacts 0N to 9N, inclusive, which are actuated by receipt of the code combination corresponding to the respective numbers. The switches 2 and 3 may be provided or associated with manually operable keys 5K and 6K for setting them in any desired position at the beginning of operation or at any other time.

At the beginning of operation the units switch-arm 11U may be set on its contact No. 1 by operation of key 5K and the tens switch 12U may be similarly set on contact 0, thus setting up the number 01 corresponding to the number of the first message. Prior to message transmission over line or channel 1, the operator or attendant at the distant station will transmit or cause to be transmitted eight "Letters" code combinations. The selector magnet TRS will respond to the incoming code combinations and actuate a start-stop selector mechanism (not shown but well understood to those skilled in the art) to close the contact 4, which is pull-bar operated on the "Letters" combination, eight times in succession thus energizing and releasing the stepping magnet 7 eight times, stepping the arm of switch SW9 up to its eighth contact. When this occurs battery will be supplied to operate relay 10. Relay 10 will lock up over the back contact of relay 13, supply battery to energize the stepping magnet 11 and supply battery to a conductor 10*a*. Stepping magnet 11 is of the type which steps its associated switch-arm upon release. The energization of the magnet produces no effect except to prepare for stepping the switch upon release. Likewise, battery applied to conductor 10*a* produces no effect at the instant of its application.

Let us now suppose that the first message is preceded by the message designating codes "Figs.," the code for 0, and the code for numeral 1. When the "Figs." code actuates the selector mechanism it will function to close the universal contact 6 which energizes the release magnet 8 which restores the arm of switch SW9 back to its zero contact. The "Figs." signal also closes the contact 14 which supplies battery to actuate the slow-release relay 15. The actuation of slow-release relay 15 closes its contacts and presents battery to the winding of relay 16 which does not operate at this time because none of the numerical contacts 0N, 1N, 2N, etc. is closed. With the "Figs." contact remaining closed the code combination for zero is now received and interpreted by the selecting mechanism to close the "tens" contact 0N to which the arm 12U is now connected. This closes the circuit from conductor 10*a* to energize relay 16 through the left-hand back contact of relay 17. Relay 16 prepares a locking contact for itself, through the winding of relay 17, but relay 17 does not operate at this time because the ground connection through contact 0N short-circuits its winding. When contact 10N reopens as its pull bar is restored to normal, relay 17 will operate.

Conditions are now established for receipt of the units code combination or numeral 1. Inasmuch as relay 15 remains energized at this time, receipt of numeral 1 causing the closing of numeral contact 1N will cause the operation of relay 13 as follows: From ground over contact 1N of the typing reperforator, contact 1U upon which the arm 11U of switch 2 is assumed to be standing, winding of relay 13, front contact of relay 17, to conductor 10*a*. Immediately after the opening of contact 0N the contact 1N is closed by the selection of the numeral 1 and activation of the corresponding pull bar. The operation of relay 13 as just described, opens the path through operating winding of relay 18, said path extending through a front contact of slow-release relay 15 through a platen contact 19 which is closed only when the letters code has moved the platen to the letters or lower case position. The next code combination following the number designation is always assumed to be a letters signal which opens the circuit through the winding of the slow-release relay 15 and closes contact 19. However, inasmuch as the relay 13 had operated to open the path through the winding of relay 18 at the front contact of relay 13 and also because the relay 10 has been released by the operation of relay 13, relay 18 cannot be energized.

Now let us consider what happens when a false number signal is received immediately after the eight letters code combination had preceded the transmission of the first message. Relay 10 will then be operated and the next "figures" signal will operate relay 15. Then if the tens digit of the message number were not correct, the relay 16 would not energize with the obvious result that the relay 13 would not have been energized upon reception of the units digit whether the units digit was or was not correctly received. And, furthermore, if the units digit received was not correct, that is, if it did not correspond to the setting of the arm 11U, relay 13 could not be energized and upon the return of platen to the letters position upon the succeeding letters signal, relay 18 would be energized because inasmuch as the relay 13 did not operate the relay 10 continued to be locked and to supply battery to the conductor 10*a*. Upon operation of the relay 18, it closes at its front contact a path through an alarm device such as a light or bell which continues to be closed until an attendant recognizes that the system had registered a failure to check the number of the message just received as being correct and operates a key 20 to open the alarm circuit and release relay 18.

Thus, a system is provided in which consecutively numbered messages may be automatically checked off, one by one, with the production of a suitable indication in case the number of any message does not check. In case the circuit 1 incoming from a remote station is set up on a half-duplex basis, the alarm circuit may include a contact which controls the sending of a break signal back over the channel 1 thus interrupting transmission at the remote station in addition to registering the alarm at the station illustrated. Other features, as may be desired, may be added in the alarm circuit by methods well known in the art, as for example, a loud ringing bell common to the office and arranged to be operated when relay 18 of any circuit in the office is operated.

It will be understood that for each release of relay 10 stepping switch 11 will advance the arm 11U one step. Another arm 11U1 moves over a series of contacts of which only the No. 9 contact is connected to a stepping magnet 21 which thus becomes energized when the arm 11U1 reaches the No. 9 contact. Whenever the arm 11U1 steps off the No. 9 contact, the magnet 21 will be released and step the arm 12U one step forward. As illustrated, the arrangement will repeat the numbers for every one hundred messages, the one hundredth message being numbered 00 because at this time both arms 11U and 12U will stand upon their zero contacts. In so far as described the selector magnet TRS has been assumed to be the magnet of a typing reperforator which produces a perforated tape which is a record of all the incoming code combinations. From this tape messages may be read inasmuch as a well-known type of typing reperforator in use prints the message legibly upon the tape or the same tape may be used in an automatic or machine transmitter to control the retransmission of the message over another circuit or channel. The tape from the typing reperforator may extend directly into an associated retransmitter (not shown) with the intervention of a tape stop arm. In such arrangements there are sometimes employed a device for causing the reperforator to step out the additional tape at the end of the message. Such stepping out of additional tape may be controlled by a manual key or push-button. In the case wherein the stepping out of additional tape causes the tape to be impressed with letters signals by operating the selector magnet TRS locally in accordance with letters signals, a switch 22 should be opened during the stepping out of the tape. This switch may be opened manually or it may be interlocked with the manual key (not shown) which controls the stepping out tape so that when the manual key is operated to cause the stepping out of the tape, the switch 22 will open with the result that the stepping magnet 7 is not energized and switch SW9 is not actuated.

It will be noted that the switch SW9 responds to an end-of-message signal which consists of eight consecutive letters code combinations with no other code combination intervening. For ordinary transmission of plain text, the switch SW9 could be replaced by a contact which responds to a more conventional end-of-message signal such as "Figs. J" (upper case J). However, in systems wherein the message transmitted consists of ciphered codes and especially in the case of random cipher codes, upper case J or any other conventional simple end-of-message signal is likely to occur at relatively frequent intervals with the result that false end-of-message signals would be registered. However, by using eight consecutive letters signals as an end-of-message signal, false end-of-message signals would seldom occur with random ciphering. The probability of any code combination being a letters signal in a ciphered message is one in thirty-two and the probability that eight consecutive letters signal would occur in such transmission would be one in $32^8$ characters or codes. Thus a false end-of-message signal would occur, on the average, only once in considerably over a thousand billion characters. This probability may be slightly, but unimportantly, increased by the fact that the first code combination preceding the ciphered message would be a letters code combination, possibly at the most two letters code combinations. In such case, if the succeeding ciphered transmission consisted of seven or perhaps six consecutive letters code combinations, a false end-of-message indication might be given. This probability is very small and, of course, applies only at the beginning of a message because upon the occurrence of any other character the effect of the specially introduced letters signal or signals at the beginning is annulled.

In utilizing the present system for cipher transmission, it is contemplated that a special routine will be observed. In accordance with this routine the operator at the sending station will transmit eight or more letters codes at the beginning of the day's run followed by the upper case or figures code, followed in turn by the number of the message, followed in turn by a single letters code. Ordinarily, it is convenient in the transmission of random ciphered code and its deciphering by the deciphering instrumentalities at the receiving end that the deciphering instrumentalities be started in a definite case condition, i. e., the letters or lower case condition which is most convenient for this purpose.

In the case of transmission from an automatic tape controlled transmitter, if the sending operator or attendant happens to be provided with a perforated tape representing a ciphered message to be sent, the operator may splice onto the head end of the tape one or more figures codes followed by the number of the message, followed by a single letters code and may splice onto the trailing end of the tape the necessary eight letters codes to constitute the end-of-message signal. Alternately, however, the operator may transmit these various elements from a keyboard from time to time.

At the receiving station illustrated in the drawing, the receiving machine will produce an enciphered tape having control codes at the front and at the trailing end thereof. This message may be deciphered in the usual manner by sending it into a local circuit in combination with a deciphering tape which circuit is connected to a printer. In this case, in order to start the deciphering tape, the message number and letters signal at the head end of the tape will ordinarily be disregarded, the deciphering starting at the first code combination of the ciphered message. However, it will be obvious that if all the incoming messages are to be retransmitted in the same order over another circuit at the receiving end, the message checking instrumentalities in the tape may be used for this purpose without alteration and, furthermore, if only part of the messages are to be transmitted together with other messages, all the messages may be provided with suitable consecutive numbers and retransmitted to another station at which a similar number checking system may be operated.

The use of eight specific codes occurring in consecutive order with no code intervening as an end-of-message or supervisory signal may be applied more generally than in a message number checking system. In fact, it may be applied in any case in which more simple end-of-message codes or combinations of codes are not convenient or useful either on account of ciphering of transmitted messages or for other reasons; the means for so creating an end-of-message indication comprise instrumentalities of general utility.

The contacts 0N, 1N, 2N, etc. comprise pull-bar contacts closed in the upper case position by the 0 to 9 digits on a typing reperforator. A suitable typing instrument and means for equipping the typing instrument with such contacts is disclosed in Zenner Patent 2,323,438, dated July 6, 1943; the manner of employing, constructing, mounting and using pull bar and platen contacts is further illustrated and described in Beattie Patent 2,112,234, dated March 29, 1938, Beattie Patent 2,120,235, dated June 14, 1938, Lang et al. Patent 2,106,805, dated February 1, 1938, Watson Patent 2,082,924, dated June 8, 1937, Bacon et al. Patent 2,381,871, dated August 14, 1945, and Bacon Patent 2,495,682 dated January 31, 1950. All these disclosures are made a part of this present specification by reference.

It is permissible and within the scope of the invention that the selector TRS consists of a selector which controls only the typing instrument or which controls only a reperforating instrument or controls only an instrument which neither reperforates nor is provided with type bars and controls only the contacts 4, 5, 6, 14, 19 and 0N to 9N. In such case, the circuit through the receiving selector magnet TRS instead of being connected by a switch 22 to ground, may be connected through the same switch in series with another selector magnet *3a* which may control either a reperforator or teletypewriter or typing reperforator to record the message. In such case, the received message is reproduced by suitable instrumentalities controlled by the selector magnet *3a* and may be used in the same manner as though it had been recorded by instrumentalities connected to the magnet TRS and controlled by the magnet TRS.

For illustrative purposes, selectable contacts operated or controlled by pull bars are disclosed, selection of such contacts by vanes or other elements of teletypewriters or by fanning out circuits connected to distributors and selectors are broadly within the scope of the generic phases of the invention.

What is claimed is:

1. In a number checking system, a stepping switch corresponding to the units digit of a number, another stepping switch corresponding to the tens digit, instrumentalities for closing a contact upon receipt of the tens digit corresponding to the particular tens digit, instrumentalities closing a contact corresponding to the units digit upon receipt of the units digit, and a combination of relay means actuatable by the tens digit for preventing its interference with other relay means actuatable by the units digit.

2. In code communication apparatus, an instrumentality responsive to a series of four or more predetermined consecutive code combinations occurring in predetermined order for actuating supervisory mechanism, means whereby said instrumentality is responsive independently of what code combination or combinations precedes said four or more predetermined consecutive code combinations, and positively operated means controlled selectively, before said series is complete, by any code combination other than the predetermined series of four to prevent actuation of the supervisory mechanism.

3. In code communication apparatus designed to be responsive to ciphered transmission wherein any code combination or series of code combinations may be received in response to message transmission, supervisory mechanism, and an instrumentality responsive to a given sequence of consecutive identical code combinations transmitted independently of the cipher for actuating the supervisory mechanism, in combination with means selectively operated by the intervention in said sequence of any code combination other than the predetermined ones to prevent actuating the supervisory mechanism.

4. In a telegraph system for transmission and reception of permutation codes wherein said codes include a case shift code, a selector selectively responsive to all said incoming codes, end-of-message mechanism for performing a switching operation, means for actuating said mechanism in response to the reception of more than three identical case shift codes received in sequence independently of what code or codes preceded them, means actuated by any code other than said case shift codes interposed therebetween, and inhibiting means responsive to the actuation of said last-named means to prevent the performing of said switching operation.

5. Telegraph apparatus for automatically checking consecutive designations of messages represented by code combinations accompanying the messages and arranged in predetermined sequence for each successive message, comprising a communication channel over which the messages arrive, an intrumentality, means for preventing the instrumentality from operating in case the message designations are received in the predetermined sequence represented by their designations, and other instrumentalities controlled by message designating codes occurring out of the predetermined sequence for causing the instrumentality to operate.

6. Apparatus for checking received telegraph code combinations representing consecutive numbers some of which are two-digit numbers assigned to, accompanying designating successively received messages, which comprises a stepping device having successive checking positions corresponding to the code combinations representing said consecutive numbers, means for causing said device to check received code combinations representing two-digit numbers for correspondence with its setting, and means for advancing said stepping device to the next successive position prior to reception of the next number-representing code combination.

EDWARD F. WATSON.

REFERENCES CITED

The following references are of record in the file of this patent:

UNITED STATES PATENTS

| Number | Name | Date |
|---|---|---|
| 1,370,669 | Potts | Mar. 8, 1921 |
| 1,943,475 | Gurley | Jan. 16, 1924 |
| 1,972,326 | Angel | Sept. 4, 1934 |
| 2,159,094 | Livingston | May 23, 1939 |
| 2,193,967 | Kleinschmidt | Mar. 19, 1940 |
| 2,275,981 | Muehter | Mar. 10, 1942 |
| 2,280,924 | McDonnell | Apr. 28, 1942 |
| 2,298,840 | Purcell | Oct. 13, 1942 |